United States Patent
Waldmann

[15] 3,690,361
[45] Sept. 12, 1972

[54] ANTI-SKID ARRANGEMENT FOR WHEELED VEHICLES

[72] Inventor: Herbert Waldmann, Dauchinger Str. 28, 722 Schwenningen, Germany

[22] Filed: July 27, 1970

[21] Appl. No.: 58,512

[30] Foreign Application Priority Data

July 28, 1969 Germany..........P 19 38 182.9

[52] U.S. Cl. ..........................152/216, 60/52, 60/62
[51] Int. Cl. .........................B60b 15/00, B60c 11/00
[58] Field of Search.......180/7; 152/208, 211, 213 A, 152/216, 221; 301/46; 280/1

[56] References Cited

UNITED STATES PATENTS

| | | | |
|---|---|---|---|
| 1,982,861 | 12/1934 | Dietz | 152/216 |
| 2,912,035 | 11/1959 | Hill | 152/216 |
| 2,947,336 | 8/1960 | Gutierrez | 152/216 |
| 3,089,528 | 5/1963 | Aler | 152/216 |

*Primary Examiner*—A. Harry Levy
*Attorney*—Michael S. Striker

[57] ABSTRACT

A rotatable vehicle wheel has two oppositely facing axial sides and is provided at each of these sides with a mounting ring which is displaceable circumferentially with reference to the wheel. A tire is mounted on the wheel and provided on its circumferentially extending tread face with at least one groove extending across the tread face inclined to the circumference thereof. An elongated anti-skid band is partially and sliably received in the groove and has two spaced end portions each of which is connected with one of the rings, and longitudinally adjacent spiked and non-spiked tread surface portions located intermediate the end portions. A displacing arrangement can be actuated for causing stepwise longitudinal sliding travel of the band in the groove so as to either expose the spiked or the non-spiked tread surface portion of the band in this groove depending upon whether the non-skid properties of the band are to be utilized or not. At least one actuating element is connected with the mounting rings and rotates with the wheel, moving during such rotation in a predetermined path and being operable for effecting actuation of the displacing arrangement. Operator-controllable triggering means is provided and is movable between a rest position and an actuating position. In the latter it extends into the predetermined path of movement of the actuating element and in response to contact with the same triggers operation of the actuating element at least once during each revolution of the wheel.

30 Claims, 10 Drawing Figures

ANTI-SKID ARRANGEMENT FOR WHEELED VEHICLES

BACKGROUND OF THE INVENTION

The present invention relates generally to wheeled vehicles, and more particularly to an anti-skid arrangement for such vehicles.

It is hardly necessary to point out that many and strenuous efforts have been made to provide arrangements which counteract the tendency of wheeled vehicles to skid under certain circumstances, for instance on ice or the like. These attempts range from particular tire tread profiles via special tire chains and analogous elements to the rather sophisticated arrangement disclosed in German Pat. 1,197,341. This latter arrangement provides the vehicle tires with one or more grooves extending transversely at an angle to the circumferential tread face of the tire, with anti-skid bands being partly received in the grooves and having at least two longitudinally adjacent surface portions one of which may be smooth or provided with a conventional profile, and the other of which is provided with a profile and in addition thereto with spikes or studs. An arrangement is provided for longitudinal discs longitudinally displacing this band or these bands in sliding movement in the respectively associated grooves so that either the spiked or the non-spiked tread surface portion of the band is located in the groove and thus exposed as a portion of the tread surface of the tire. Evidently, when the spiked surface portion is so exposed, it will come in contact with the surface on which the tire rolls and will provide such anti-skid action as is afforded by its spikes. On the other hand, when the band is longitudinally displaced in such a manner that its non-spiked surface portion is located in the groove, then the spiked surface portion is located laterally of the tire tread face and thus cannot come into contact with the ground or surface on which the tire rolls. Thus, instead of requiring a change-over from non-studded to studded tires when circumstances necessitate the use of the latter, the construction according to the aforementioned prior-art patent makes it possible to utilize one and the same tire under all circumstances but to provide for a rapid change-over to different anti-skid properties of the tire when this is necessary. The known prior-art arrangement, however, provides for a longitudinal shifting or displacement of the anti-skid band or bands due to braking action of the vehicle, and the brake delay necessary before the displacement of the anti-skid bands takes place is quite significant. Evidently, this is a disadvantage just as is the fact that in this known arrangement it is not possible to shift the anti-skid bands back to inoperative position—that is to shift them in such a manner that the spiked or studded tread portion of the bands is moved out of the tire grooves. In other words, the shifting action afforded by relatively strong delays permits only a movement of the anti-skid bands in a sense shifting the studded tread surface portion into place for operational use; this necessitates the aforementioned rather strong braking action which may be dangerous when it must take place under the conditions which alone necessitate the utilization of the spiked tread surface portions in the first place. Also, the impossibility of withdrawing the spiked tread surface portions from operative to inoperative positions during movement of the vehicle is a disadvantage. Finally, this known construction has an additional drawback, namely the impossibility to displace the anti-skid bands to operative position—where the studded tread surface portion is located and exposed in the tire grooves—while the vehicle travels in reverse.

SUMMARY OF THE INVENTION

It is, accordingly, an object of the present invention to provide an improved anti-skid arrangement for wheeled vehicles.

More particularly it is an object of the present invention to provide such an improved arrangement which overcomes the aforementioned disadvantages of the prior art.

A concomitant object of the invention is to provide such an improved arrangement which permits a reliable and safe displacement of the anti-skid bands between operative and inoperative positions during movement of the vehicle, whether it be in forward or in reverse direction.

A concomitant object of the invention is to provide such an arrangement of the type heretofore discussed which requires the minimum possible mechanical stress on the constituent components of the arrangement during displacement of the anti-skid band or bands between operative and inoperative positions.

Still another object of the invention is to provide such an arrangement as here under discussion which is simple in its construction and reliable in its operation.

In pursuance of the above objects, and others which will become apparent hereafter, one feature of the invention resides in an anti-skid arrangement for wheeled vehicles which, according to one embodiment and briefly stated, comprises a rotatable vehicle wheel having two oppositely facing axial sides. A pair of mounting rings are each secured to one of these sides and displaceable circumferentially with reference to the wheel. A tire is mounted on the wheel and has a circumferentially extending tread face provided with at least one groove extending across the tread face inclined to the circumferential direction thereof. An elongated anti-skid band is partially and slidably received in this groove and has two spaced end portions each of which is located at one of the axial sides and fixed to one of the mounting rings, and longitudinally adjacent spiked and non-spiked tread surface portions intermediate the end portions. Displacing means is actuatable for effecting stepwise circumferential displacement of the mounting rings in a sense causing concomitant longitudinal sliding of the band between two terminal positions in one of which one of the tread surface portions is accommodated and exposed in the groove. At least one actuating element is connected with the mounting rings for rotation with the wheel in a predetermined path and is operable for effecting actuation of the displacing means. Finally, operator-controllable triggering means is provided and is movable between a rest position and an actuating position in which latter it extends into the aforementioned predetermined path of the actuating element for triggering operation of the latter at least once during each revolution of the wheel.

Thus, it will be seen that the basic concept of the present invention is to utilize the rotation of the wheel itself to thereby obtain an oscillatory movement which is converted into a movement circumferentially of the wheel for affording the requisite longitudinal sliding displacement of the anti-skid band or bands. By carrying out the operation of the displacing means in stepwise manner, the mechanical forces acting upon the constituent components of the device during any one such step is comparatively low.

The arrangement can utilize one or more bracket members and can be such that contact of the bracket members with the displacing means of the arrangement actuates the latter for effecting the necessary stepwise operation and therefore stepwise longitudinal sliding displacement of the anti-skid bands, with the displacing device being actuated for movement in one or the other direction depending on whether the spiked tread surface portion is to be moved into or out of the groove in the tire tread face. The bracket may for instance be in form of a springily mounted bracket which may be pivotably mounted on the mounting rings themselves, or else the triggering means may be provided with such a bracket which produces oscillatory movement of a suitably constructed actuating element when it is moved to a position in which it can contact the actuating element during movement of the latter with the wheel. It is preferable to connect the mounting rings with one another, although it is not absolutely necessary for the purposes of the present invention. If a connection is to be established, then rigid or elastic traverse members may be provided extending through suitable cut-outs provided in the wheel and connecting the mounting rings to one another. They may have the further purpose of having the bracket or brackets mounted on them rather than mounting these brackets directly on the rings. The brackets in such a construction would rotate with the wheel and would be deflected during each complete rotation at least once, by engagement with suitable triggering means which for this purpose can be displaced to and from a position in which it extends into the path of the bracket. In any suitable manner, for instance mechanically, hydraulically or pneumatically, the displacement of the bracket is then transmitted to the displacing means which effects displacing of the anti-skid band or bands in the necessary and desired manner.

According to a very simple embodiment of the invention, two brackets may be springily and pivotably mounted to the mounting rings or to traverse members connecting these mounting rings, and then be separately actuatable by the triggering means. The brackets may be either each connected with a portion of the displacing means for the mounting rings, with each portion thus connected with one of the brackets effecting displacement of its respective mounting ring in a circumferential sense opposite that of the other mounting ring, or both brackets may act upon the displacing means in a sense causing displacement of the mounting rings in one and the same circumferential direction. In that case a switching arrangement must be provided which can reverse the circumferential direction of displacement of the mounting rings depending upon whether spiked tread surface portion of the anti-skid band is to be moved into or out of the groove in the vehicle tread face.

Advantageously, but again not necessarily, the triggering means may utilize a turnably mounted roller member which is movable between at least two positions, namely a rest position and an actuating position, and which in the rest position is withdrawn from the bracket or brackets while in its actuating position it contacts and rolls on the bracket or brackets at least once during each rotation of the wheel (and therefore of the bracket or brackets). The construction of the bracket (which is to be understood as including the possibility of plural brackets, such as two) may advantageously be such that it extends arcuately around substantially half the circumference of the vehicle wheel; in this case it may be pivotably connected at its opposite ends with the mounting rings or with traverse members associated with the mounting rings. The triggering means, for instance the aforementioned roller member, then rolls along the entire arcuate curvature of the bracket and continuously deflects the latter in such a manner that on reaching of the roller member of the apex of the curvature the bracket receives its maximum deflection which is then utilized for activating the displacing means.

According to a particularly simple and advantageous embodiment of the invention a switching means for reversing the direction of circumferential displacement of the mounting rings may be provided in such a manner that at least two brackets are provided which are arcuately curved in the manner discussed above, with the portions of the brackets which come in contact with the triggering means having different radial distances from the axis of rotation of the wheel, and with the triggering means being further displaceable between two additional positions corresponding to the difference between these distances, so that it can in one of these additional positions contact one of the contact portions of one of the bracket members and in the other of the additional positions contact the contact portion of the other bracket member. In other words, the triggering means must thus be capable of displacement not only between the aforementioned rest position and actuating position, but also between the two additional positions mentioned above. The actuation of the triggering means itself can be carried out in suitable and desired manner, that is either purely mechanically, electromagnetically, pneumatically or hydraulically. According to one embodiment of the invention the necessary movement of the triggering means between its various positions can be carried out via two cylinder and piston units the directions of displacement of whose pistons—which may be hydraulically or pneumatically operated—extend at an angle to one another, preferably but not necessarily at an acute angle.

A simple mechanical construction for the displacing means is to provide two portions acting upon the respective mounting rings in mutually opposite circumferential directions. These portions may comprise two toothed segments or segmental racks each provided on the wheel at one axial side thereof. The associated brackets then are each provided with a spring-loaded pivotally mounted pawl cooperating with one of these racks so that, when the respective bracket is actuated by the triggering means, its pawl moves along the associated rack by one tooth, thus providing the stepwise movement of the mounting ring on which the bracket is mounted or with which it is connected. In this case the triggering means cooperates only with one of the brackets at a time so that only one of the rings is turned at a time. Of course, the sliding displacement of the anti-skid band or bands can be aided by accelerating or retarding forces acting upon the wheel, because this causes additional pulling or pushing forces to act upon the skid bands.

According to a further advantageous embodiment of the invention pneumatic or hydraulic means may be provided wherein the displacing means for the mounting rings is provided with one or several fluid-operated cylinders as well as with one or several pumps cooperating with these cylinders and actuatable by the triggering means. These pumps, when so actuated, preferably produce a hydraulic—but if desired a pneumatic—pressure by means of which the piston of the cylinders and therefore the mounting rings are displaced with concomitant displacement of the associated skid band or bands. If for instance two double-acting cylinder and piston units of this type are provided, then it is advantageous to use two pumps each of which is connected with one side of the respective cylinder and piston units. However, it is also possible to connect both pumps with both sides of the cylinder and piston units. In this case a hydraulic or pneumatic switching arrangement must then be provided which switches the output of the pumps either to one side or the other side of the double-acting cylinder and piston unit, and both pumps must then be sequentially activatable during each rotation of the wheel by the triggering means provided for this purpose. In such a construction the effectiveness of the pumps during a single rotation of the wheel, and therefore the force acting upon the anti-skid band in a sense effecting displacement of the latter, can be doubled. Here, again, the brackets may be arcuately curved in the manner already discussed, and the triggering means may be constituted by or may utilize a turnably mounted roller as discussed.

It is advantageous in this construction to utilize not only a single cylinder and piston unit but two or several which engage the respective mounting rings at diametrally opposite portions of the same. In this case the radially directed forces acting upon these diametrally opposite portions of the respective mounting ring are compensated by a moment-compensating rod, that is by a rod extending between these portions and connecting them to reinforce the ring. Advantageously, the two thus-associated cylinder and piston units are so connected with one another that they are arranged in parallelism as concerns the fluid circuit to and from the associated pump or pumps.

It is advantageous to connect the piston rods of the cylinder and piston units with the respective mounting rings, and to connect the cylinders themselves with the wheel. In this case it is advisable but not necessary to locate energy-storing devices—for instance in form of springs—between the wheel and the cylinders so that these storage devices store energy when the force produced by the pumps is not yet adequate to overcome the relatively large frictional forces acting upon and preventing movement of the mounting rings and the anti-skid band. In this case the pump energy is stored in the energy storing devices until such time as it is adequate in combination with the additional force produced by the pumps to overcome the frictional resistance and inertia opposed to it.

In the event that both pumps act upon one and the same side of the cylinder and piston units—where it is desired to increase the available pressure—then a switching or transfer device must be provided which is capable of switching the output of the pumps from one side of the cylinder and piston unit or units to the other side. This has already been pointed out before. According to one embodiment of the invention it is advantageous to utilize for such a device a rocker member which is alternately rocked from one to another end position by an auxiliary cylinder and piston unit, and to provide two control valves in the fluid circuits of the pumps, which control valves are alternately opened and closed against the biasing force of a restoring spring tending to maintain them in closed condition, to thereby permit establishment of a circuit between the pumps and either one or the other side of the cylinder and piston unit or units. If in this case the triggering means acts upon the actuating elements, such as the brackets, then the force produced by the energized pumps first acts upon the auxiliary cylinder and piston unit which in turn acts upon the rocker member to displace the same from whatever end position it is in to the opposite end position. This causes one of the two control valves--namely the one associated with the end position to which the rocker member is being displaced—to be opened so that the pressure supplied by the pumps acts upon one side of the cylinder and piston unit and causes the desired displacement of the associated mounting ring and thereby of the anti-skid band. The auxiliary cylinder and piston unit acting upon the rocker member can be allowed to return to its starting position by bleeding the pressure acting upon it, via a suitable valve such as a capillary tube or the like. After the anti-skid band has been displaced to the desired extent, the triggering means is moved to rest position whereby the pumps are de-activated. When the triggering means is subsequently again moved to actuating position acting via the bracket or brackets upon the pumps, then the auxiliary cylinder and piston unit again becomes energized and now moves the rocker member from the end position to which it originally displaced it back to the previous end position. This again results in opening of the other control valve and the output of the pumps is now switched to the opposite side of the cylinder and piston units whereby the anti-skid band is moved in the direction oppositely the one in which it was previously moved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
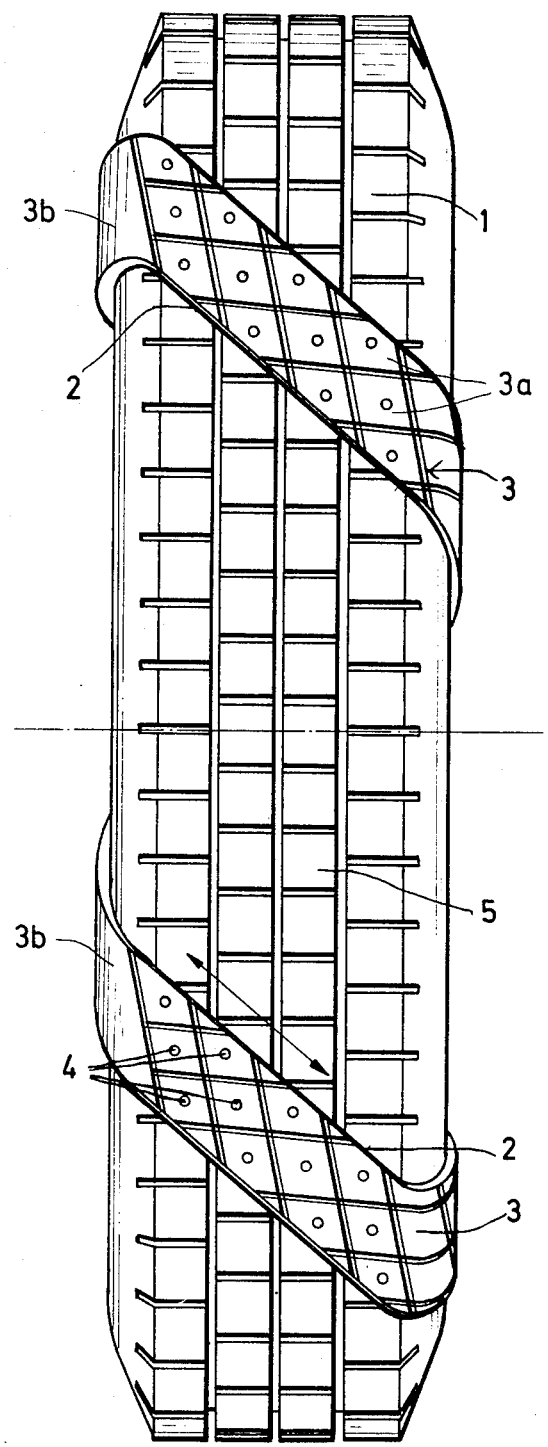
FIG. 1 is an elevational view illustrating the tread surface of a vehicle tire provided with an arrangement according to the present invention.

Discussing now firstly FIG. 1 it will be seen that reference numeral 1 identifies a vehicle tire of any conventional construction, having a circumferentially extending tread face 5 which engages the ground on which the tire rolls when it is provided on a vehicle. The tread face 5 is provided with one or more—in the illustrated embodiment two—grooves 2 extending across it and inclined in circumferential direction of the tread face. Two anti-skid bands 3 are provided portions of which are received in these grooves 2, and the anti-skid bands 3 are displaceable in the grooves 2 in the direction of the double-headed arrow shown in FIG. 1. The anti-skid bands 3 are provided with opposite end portions 3c (see FIG. 2) and, located intermediate these end portions 3c, with a spiked tread surface portion 3a and a non-spiked surface portion 3b. The portion 3b may be smooth or it may be profiled, and the portion 3a is profiled as clearly shown in FIG. 1 and is in addition provided with the spikes or studs 4 which are intended to prevent skidding of a vehicle provided with the tires and arrangement according to the present invention. The purpose of the arrangement according to the present invention is to afford sliding displacement of the anti-skid bands 3 in the respective grooves 2 between a position in which the spiked tread surface portions 3a are located in the grooves 2 and thus exposed for contact with the surface on which the tire rolls, and another position in which the non-spiked tread surface portions 3b are located in the grooves 2 with the spiked portion 3a being located laterally of the tread face 5 so that the spikes 4 do not come into contact with the ground on which the tire rolls. The two end positions are so selected that the entire or almost the entire length of the respective groove 2 is filled with the surface portion 3a when the latter is in the position shown in FIG. 1, whereas the surface portion 3a is completely withdrawn from the grooves 2 and the latter are filled entirely with the surface portion 3b when the spikes 4 are not to be utilized.

Figure 2:
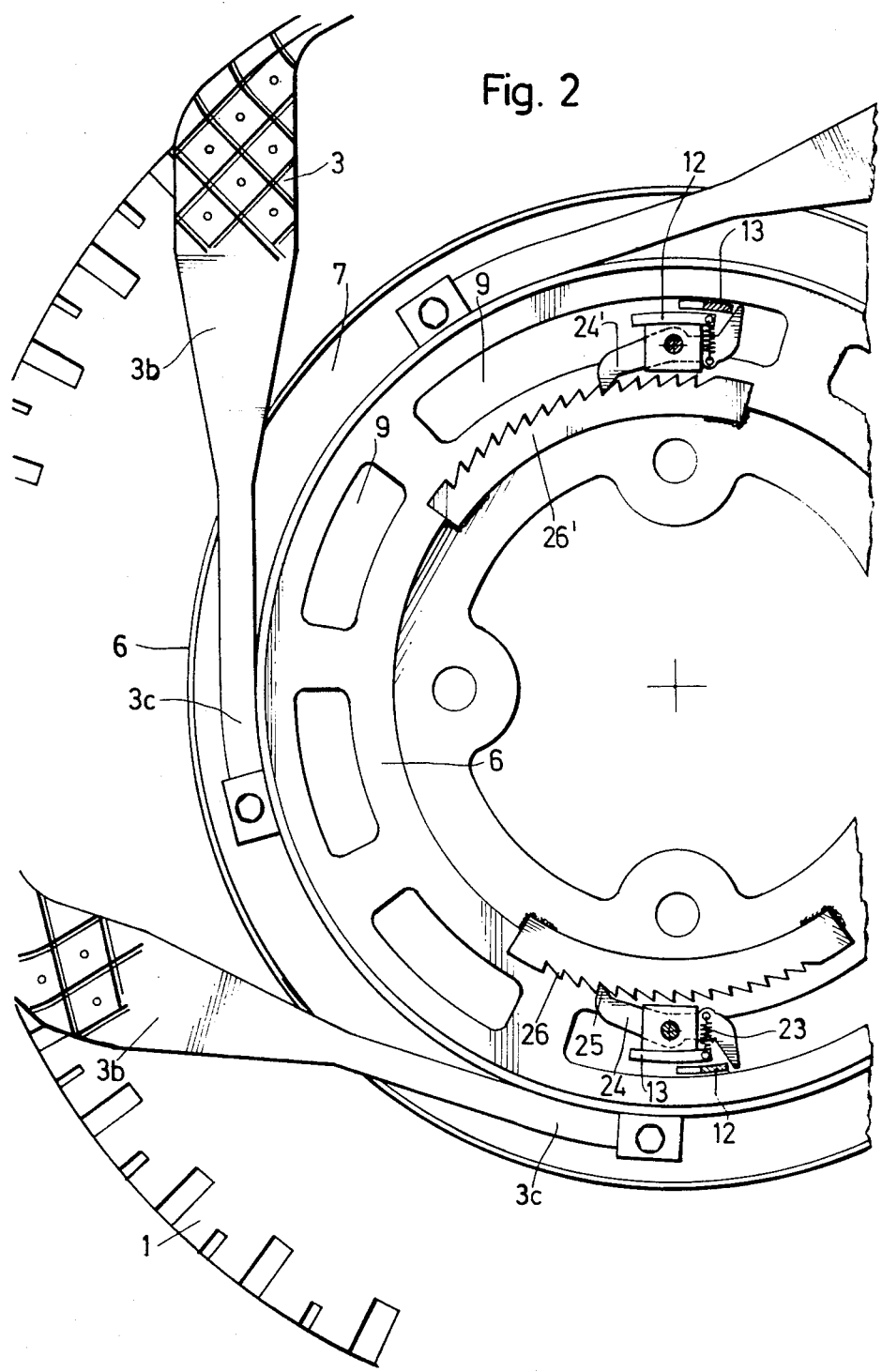
FIG. 2 is a fragmentary side-elevational view illustrating a vehicle wheel and tire provided with an arrangement according to a first embodiment of the invention.
Figure 3:
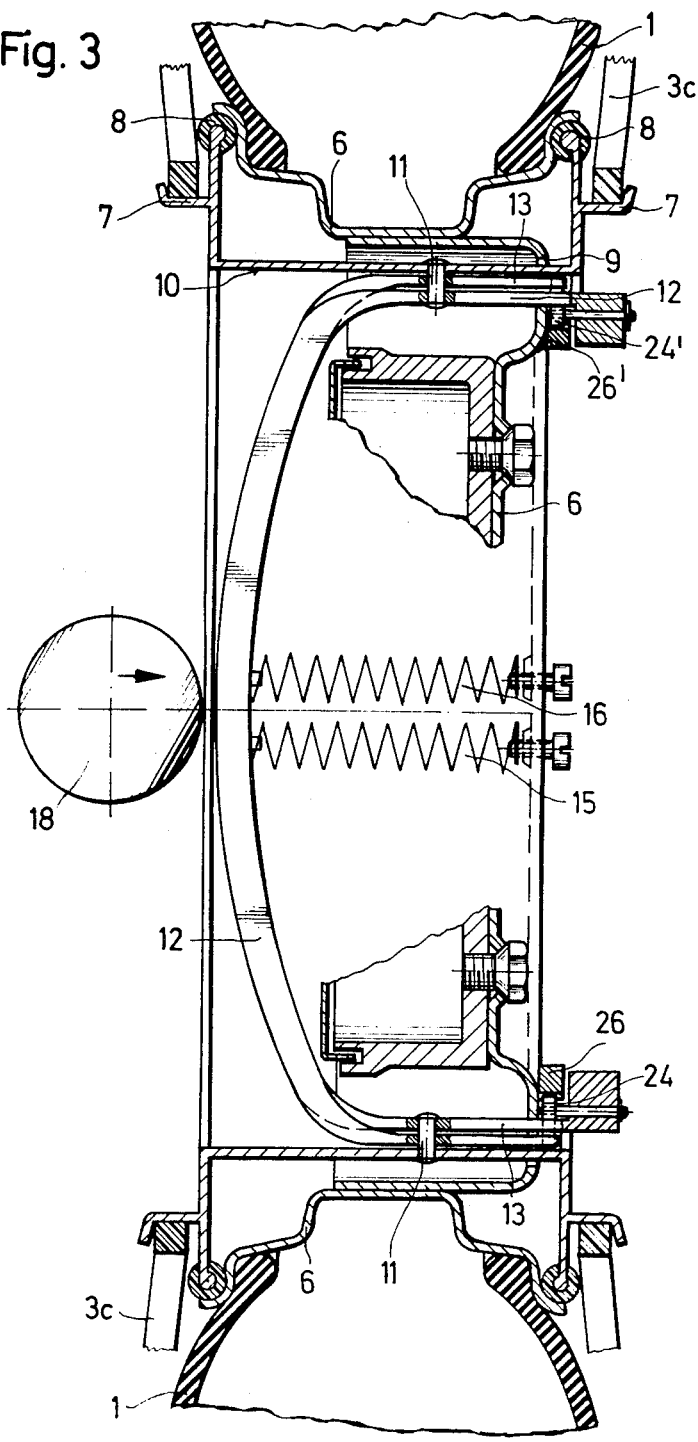
FIG. 3 is a radial section through the embodiment of FIG. 2.
Figure 4:
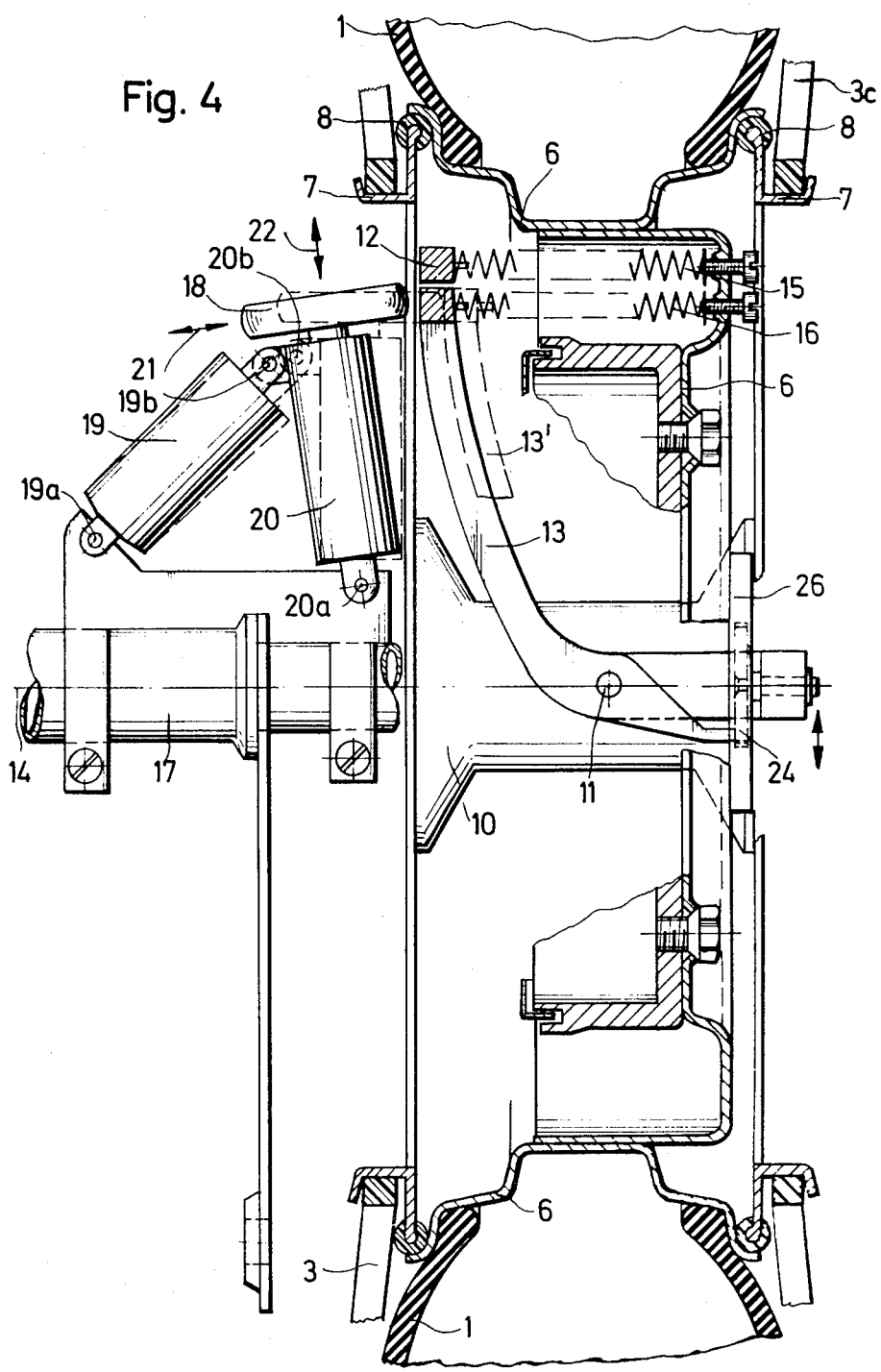
FIG. 4 is a radial section of the embodiment of FIG. 3 but displaced through 90° with respect to the illustration in FIG. 3.

A first embodiment of the invention is illustrated in FIGS. 2–4. Again, the tire is identified with reference numeral 1 and it will be seen that it is mounted in conventional manner on a wheel 6. The end portions 3c of the anti-skid bands 3 taper in width and are each secured in suitable manner to a mounting ring 7. Two of these mounting rings are provided one of which is located at one axial side and the other of which is located at the opposite axial side of the wheel 60 The mounting rings 7 are rotatably mounted on the wheel 6; engaging the latter via the beads 8 and being capable of rotational displacement circumferentially of the wheel 6.

As the drawing also shows (see particularly FIG. 2) the wheel 6 is provided with cut-outs 9 and traverse members 10 extend through these cut-outs and connect the two mounting rings 7 either rigidly or elastically with one another (see FIGS. 3 and 4). In the embodiment of FIGS. 2–4 there are provided two actuating elements in form of arcuately curved brackets 12 and 13 each of which extends substantially around half of the circumference of the wheel 6 and each of which is mounted by means of pivot mounts 11 on the traverse members 10. The arrangement is such that, as shown in FIG. 4, the apex of arcuate curvature in the two brackets 12 and 13 in each case has a different radial distance from the axis of rotation 14 of the wheel. The bracket 12 is connected with the wheel 6 via a pre-tension spring 15, and the bracket 13 is similarly connected with the wheel 6 via a pre-tension spring 16, and these springs normally bias the brackets to the inoperative position shown in full lines in the drawing.

FIG. 4 shows that in this embodiment the triggering means is in form of a turnably mounted roller 18 and two cylinder and piston units 19 and 20. The units 19 and 20 as well as the wheel or roller 18 are mounted on the axle 17 so that they do not rotate as the wheel 6 rotates. However, by activating the cylinder and piston unit 19 which is pivotably mounted at 19a on the axle 17 and is further pivotably connected with the roller 18 at 19b, the roller 18 can be displaced in the direction of the double-headed arrow 21. When the unit 19 is activated, which may be effected mechanically, pneumatically, hydraulically, or in other suitable manner, the roller 18 moves from the full-line position of FIG. 4 to the broken-line position. When the unit 20, which is pivotably connected with the axle 17 at 20a and pivotably connected with the roller 18, is activated then the roller 18 is further displaced in the direction of the double-headed arrow 22 in FIG. 4. Evidently, these movements of the roller 18 are possible because of the pivotable connections at 19a, 19b, 20a and 20b. The roller 18 is preferably but not necessarily mounted on the piston rod of the unit 20, but in any case it must be turnably mounted. FIG. 4 clearly shows that activation of the unit 19 causes the roller 18 to be displaced from the full-line position to the broken-line position. In this position—and with the unit 20 not activated—the roller 18 engages the apex of curvature of the bracket 13 once during each rotation of the wheel 6, because the bracket 13 rotates of course with the wheel 6. Such engagement causes the bracket 13 to be displaced to the fragmentarily illustrated broken-line position 13' and when the engagement is terminated the spring 16 restores the bracket 13 to the full-line position. During each displacement of the bracket 13 by contact with the roller 18, a pawl 24 which is spring loaded by the spring 23 (see especially FIG. 2) engages with its nose or projection 25 a toothed segment or rack 26 secured stationarily on the wheel 6. THe pawl 24 is pivotably mounted on one end of the bracket 13 and its engagement with the segment 26 results in circumferential displacement relative to the wheel 6 of mounting rings 7. Of course, the oppositely positioned pawl 24' which is mounted in similar manner on the bracket 12, is simultaneously lifted out of engagement with the similar toothed segment 26' via the bracket 13. In this manner the rings 7 are advanced stepwise via the bracket 13 during each operation or displacement of the latter by means of the roller 18, and such stepwise displacement takes place by a distance corresponding to the distance between the teeth of the segment 26. This, in turn, results in sliding displacement of the anti-skid bands 3 in the grooves 2 until the desired end position of the anti-skid bands is reached. This movement is facilitated by the braking force acting upon the anti-skid bands 3 during contact of the same with the ground on which the tire rolls.

When the unit 20 is activated, thereby displacing the roller 18 in the direction of the double-headed arrow 22 in FIG. 4 out of the full-line or broken-line position shown in that Figure, then the roller 18 assumes such a position that on actuation of the unit 19 it engages with the bracket 12 rather than with the bracket 13. It activates then the bracket 12 once during each rotation of the wheel 6 so that it is now the pawl 24' associated with the bracket 12 which engages with the segment 26 rather than the segment 26', so that simultaneously the pawl 24 is disengaged from the segment 26 and the mounting rings 7 are circumferentially displaced with reference to the wheel 6 in the direction opposite to the previously described direction. This then causes sliding displacement of the anti-skid bands 3 also in opposite direction whereby whatever portion of the skid bands 3 which was originally moved into the grooves 2 is now withdrawn from them.

Figure 5:
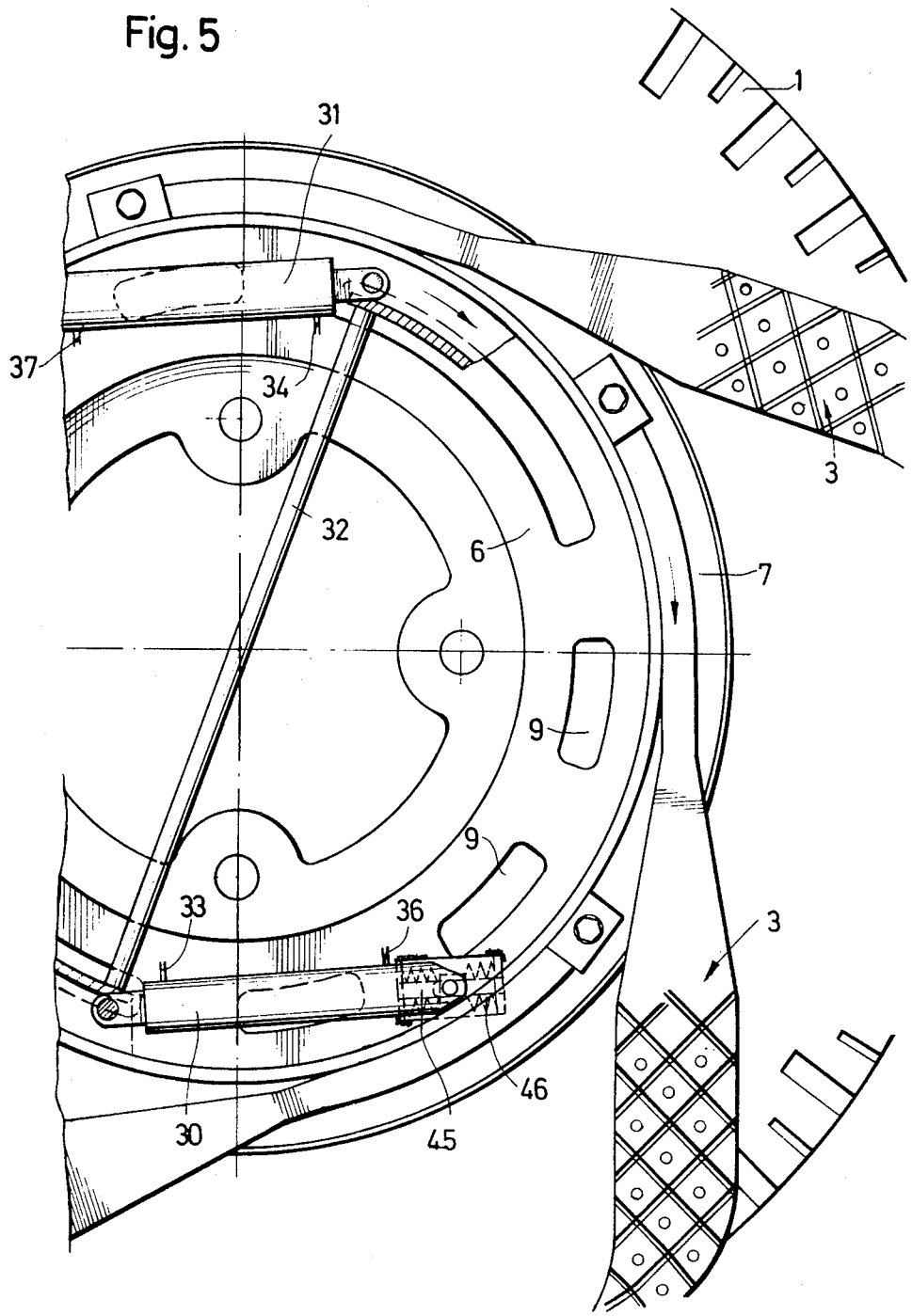
FIG. 5 is a view corresponding to FIG. 2 but illustrating a further embodiment of the invention.
Figure 6:
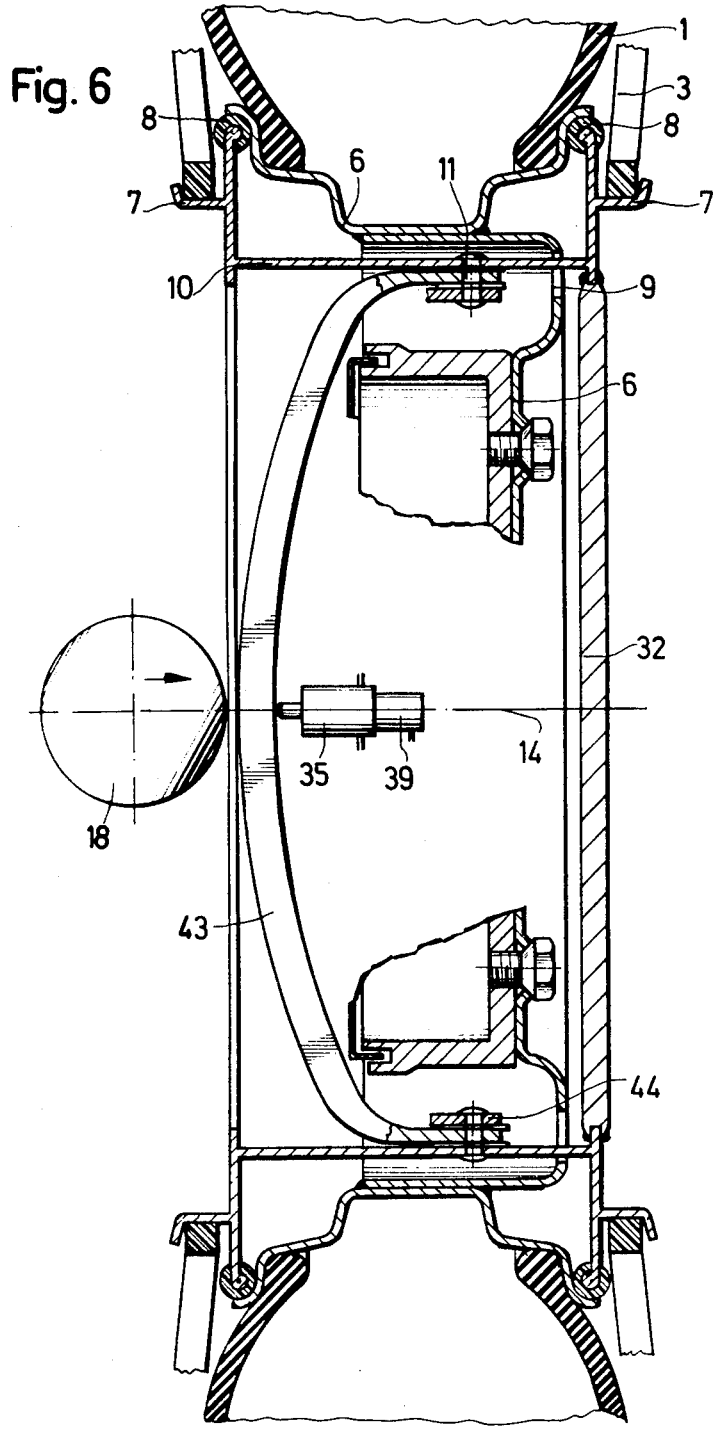
FIG. 6 is a view of FIG. 5 similar to the illustration of FIG. 3.
Figure 7:
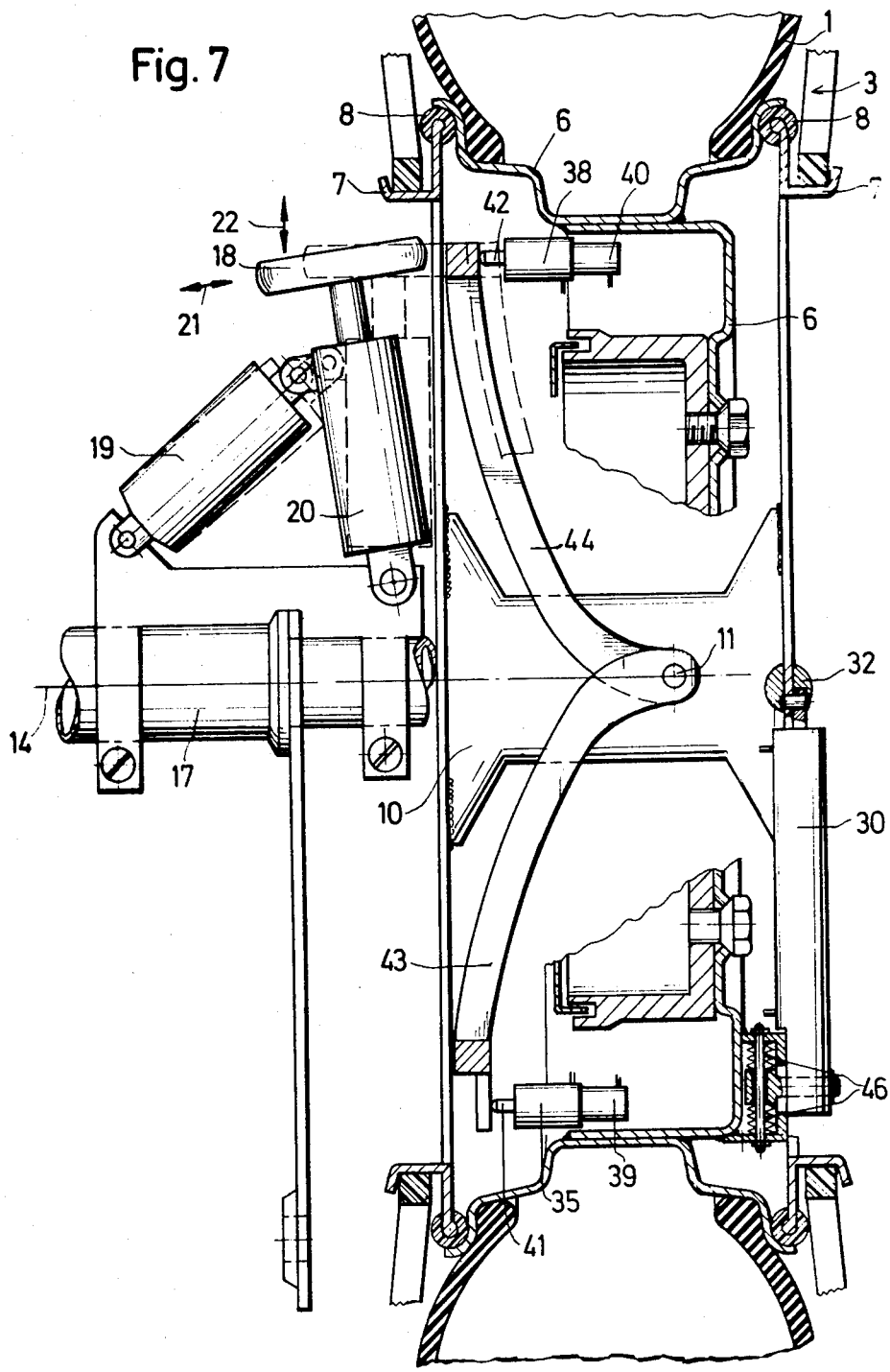
FIG. 7 is a view corresponding to FIG. 4 but of the embodiment of FIG. 5.

The embodiment illustrated in FIGS. 5–7 operates hydraulically. In this embodiment components corresponding to those of the embodiments in FIGS. 2–4 are identified with identical reference numerals. Thus, the mounting rings are again identified with reference numeral 7 but as the Figures show one of the mounting rings 7 is provided with two approximately diametrically opposite double-acting cylinder and piston units 30 and 31 which are connected with it. To compensate for the radially directed force components resulting from activation of the units 30 and 31, a moment compensating rod 32 or force compensating rod 32 is provided with extends across between and connects the portions of the ring 7 where the units 30 and 31 are connected with and act upon the latter.

FIG. 5 shows that one side of each of the units 30 and 31 is connected via fluid-supply conduits 33 and 34 in a manner which is not more specifically illustrated because it is of no consequence for the invention, with a pump 35 (see FIG. 6) which is mounted on the wheel 6. In similar manner the opposite sides of the double-acting units 30 and 31 are also connected with a second pump 38, also mounted on the wheel and communicating with this other side via the conduits 36 and 37. In addition, valves 39 and 40 are provided which respectively are associated with the pumps 35 and 38 and are activated by the piston rods 41 and 42, respectively, of the pumps 35 and 38.

In this embodiment, as in the embodiment of FIGS. 2–4, two brackets 43 and 44 are mounted on the traverse members 10 connecting the mounting rings 7, and these brackets 43 and 44 are also pivotably mounted. Here, however, the brackets extend over separate circumferential portions of the wheel 6, rather than over the same circumferential portions as in FIGS. 2–4. However, here as in the preceding embodiment the radial distance of the apices of the brackets 43 and 44 from the axis of rotation of the wheel is different, so that again a displacement of the roller 18 in the direction of the double-headed arrow 22 to a radially outer position results in engagement of the roller 18 with the bracket 44, whereas movement of the roller 18 to a radially inner position results in engagement of the roller 18 with the bracket 43. During each engagement and consequent displacement of the respective brackets the associated pumps are operated. Specifically, displacement of the bracket 43 results in activation of the pump 35 and the associated valve 39, whereas similar activation of the pump 38 and the associated valve 40 results from displacement of the bracket 44. Thus, the units 30 and 31 are fluid-powered either in one or the opposite direction and thereby activated, so that the anti-skid bands 3 are correspondingly moved in one or the other direction through the grooves 2.

According to this embodiment it is also possible to provide the earlier-mentioned energy-storing devices 46 —here utilizing a spring action—which are clearly shown in FIGS. 5 and 7 and which are provided against the possibility that the pressure initially supplied by the pumps 35 and 38 when the same start up, may not be sufficient to overcome the frictional forces which oppose displacement of the mounting rings 7 and the anti-skid bands 3. The arrangement of these units 46 between the cylinderand piston units 30, 31 and the wheel 6 is clearly illustrated. They initially store energy supplied by the pump pressure until the energy is adequate to overcome the retarding or restraining forces, and thus they facilitate the turning of the mounting rings 7 and displacement of the anti-skid bands 3 as soon as the force is larger than the retarding force opposed to it.

Coming now to FIG. 3 it will be seen that this illustrates the fluid schematic of a hydraulic system for use in the embodiment of FIGS. 5–7. The arrows 43 and 44 are intended to be representative of the brackets 43 and 44 of FIGS. 5–7 and to indicate how these brackets exert an actuating force which is here indicated as a pressure P of 60 kp, or in the vicinity of this figure. The pump 35 with its associated valve 39 on the one hand, and the pump 38 and the valve 40 on the other hand are always activated in parallel by the associated brackets 43 and 44, for instance with the identified force or pressure P. When the pump 35 and the valve 39 are activated in this manner, a circuit is established via the one-way valve 50, the conduits 33 and 34 to the left sides of the double-acting cylinder and piston units 30 and 31, and from the right sides of the units 30 and 31 via the conduits 37 and 36, the valve 39 and the one-way valve 51 back to the pump 35. The pistons 52 and 53 of the units 30 and 31—which may for instance be constructed for a maximum pressure of 200 atm. overpressure—are thus moved towards the right in the drawing, for instance in FIG. 8, by the hydraulic force developed by the pump 35. If the pistons 52 and 53 oppose a greater force to this hydraulic pressure due to the opposing forces acting upon the rings 7 and the skid bands 3, then the pressure fluid is returned via a bypass circuit in which a relief valve 59 is arranged which may be set to operate at for instance between 150 and 200 atm. overpressure.

Figure 8:
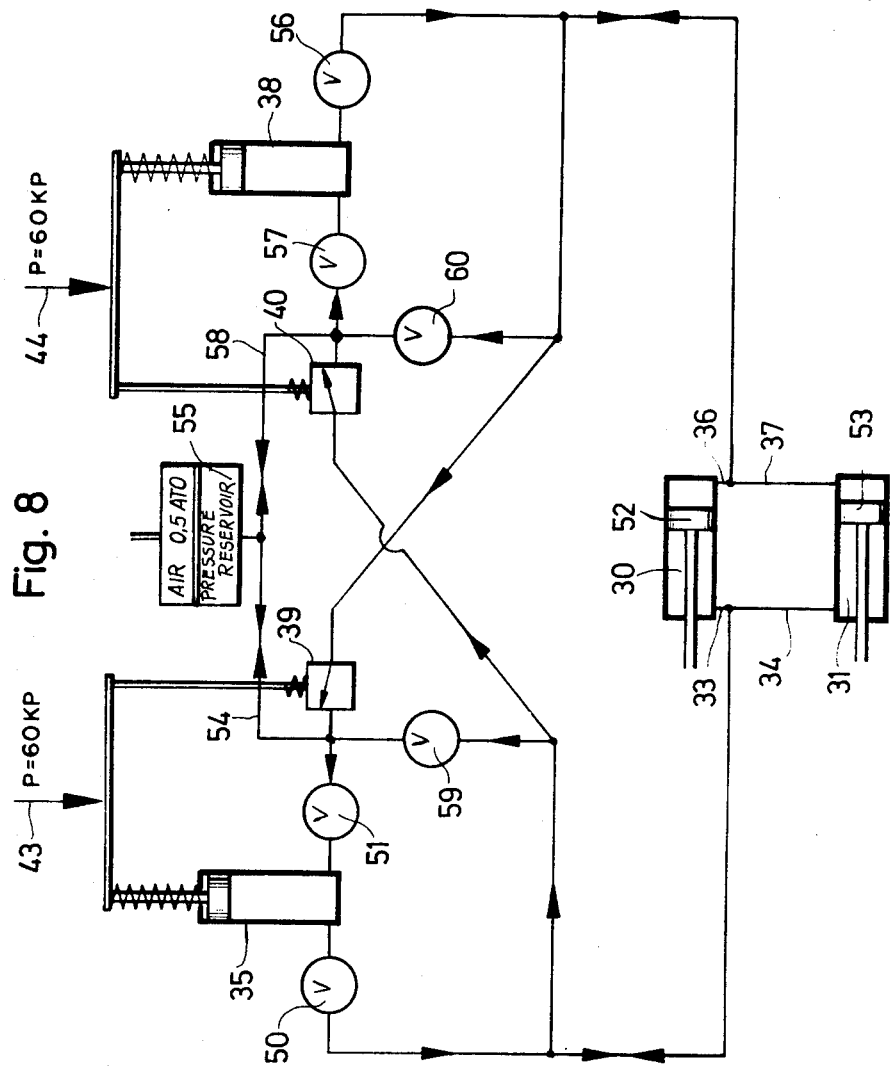
FIG. 8 is a schematic of the hydraulic or pneumatic fluid system for use in conjunction with the embodiment illustrated in FIGS. 5–7.

Correspondingly, when the pump 38 and the valve 40 are so actuated, a circuit is established from the pump 38 via a one-way valve 56 and the conduits 36 and 37 to the right-hand side of the double-acting cylinder and piston units 30 and 31, and from the left-hand sides of these units via the conduits 33 and 34, the valve 40 and the one-way valve 57 back to the pump 38. In this case the pistons 52 and 53 are shifted towards the left as seen in FIG. 8. Here, again, a bypass circuit is established via which the pressure fluid can return through the relief valve 60 if the force opposed by the pistons to such left-hand movement is greater than the force of the pressure fluid.

Both of the circuits are connected via conduits 54 and 58 with a pressure reservoir 55 which is under a pressure of approximately 0.5 atm. overpressure and provides for a pressure medium compensation at the suction sides of the pumps.

Figure 9:
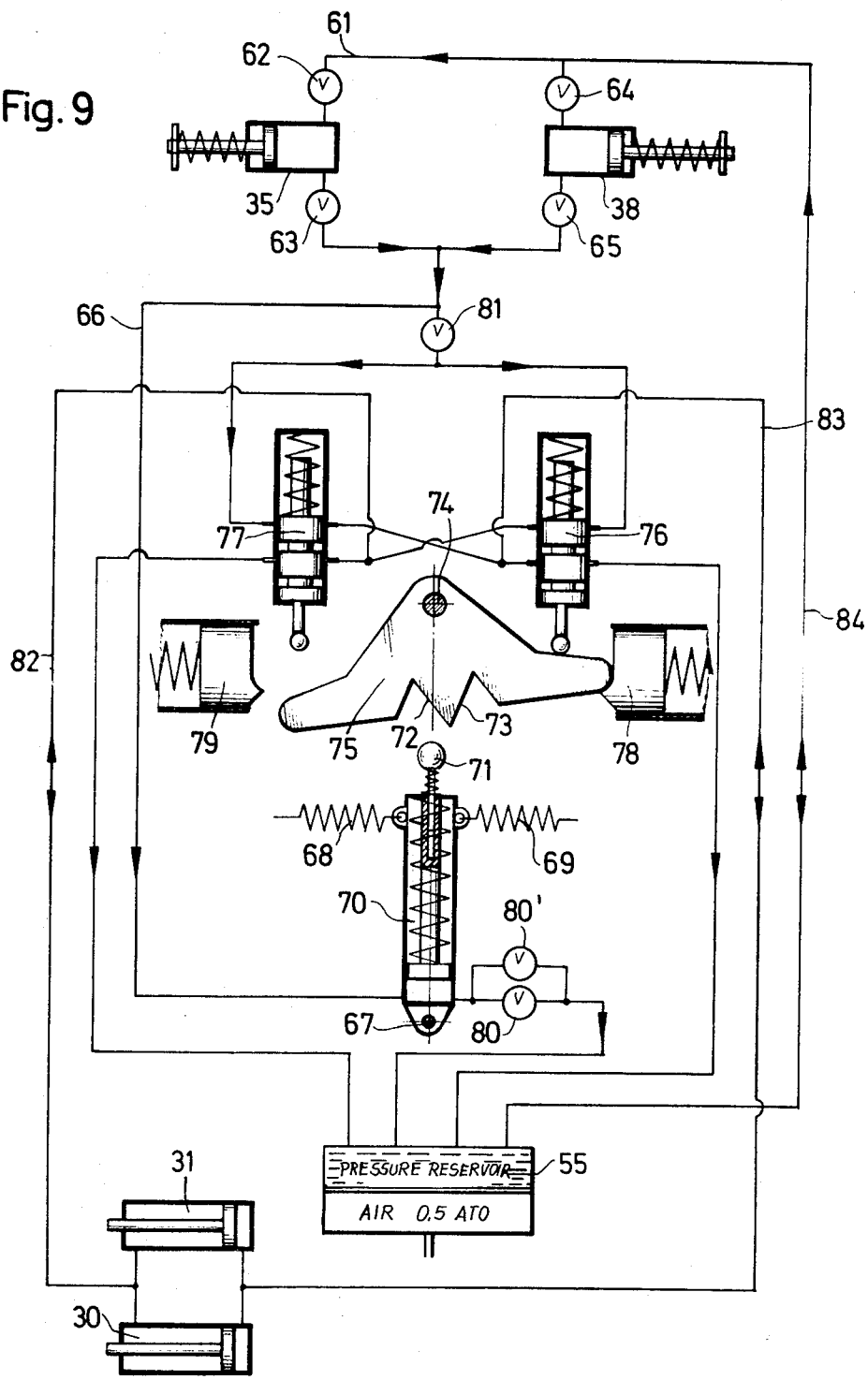
FIG. 9 is a view similar to FIG. 8 but for use with an embodiment which is a modification of that shown in FIGS. 5–7.

Coming now to the embodiment in FIG. 9 it will be seen that this somewhat resembles that of FIG. 8 in that it is an illustration of the hydraulic circuit for a somewhat modified version of the embodiment in FIGS. 5–7. Here, the (non-illustrated) brackets 43 and 44 are of identical dimensions so that during each rotation of the wheel 6 both brackets 43 and 44 are sequentially activated or displaced once. This of course results in sequential activation of the pumps 35 and 36 once during each rotation of the wheel and thus the total pump pressure available is double that in the preceding embodiment. In this arrangement the roller 18 need not be displaced in radial direction of the wheel (that is in the direction of the double-headed arrow in the preceding embodiment) so that a single cylinder and piston unit 19 is sufficient whereas the unit 20 can be omitted. Also, the hydraulic cylinder and piston unit 19 may here be replaced by a simple mechanical or electromechanical device.

However, in such an embodiment it is necessary to additionally provide a switching arrangement which makes it possible to switch the output of both pumps 35 and 38 in such a manner that the total output of both pumps can be supplied either to one side or to the other side of the units 30 and 31, with such supply taking alternately place to one and then the other side. Such a switching arrangement is shown in FIG. 9 in conjunction with the remaining components which are essentially similar to those of FIG. 8. In FIG. 9 the pumps 35 and 38 are both connected via the conduit 66 and one-way valves 63 and 65, respectively, with an auxiliary cylinder and piston unit 70. The pressure medium return is accomplished via the capillary tube 80, the pressure reservoir 55, the conduits 84 and 61 and the one-way valves 62 and 64.

The auxiliary cylinder and piston unit 70 is turnably mounted about the pivot 67 and is maintained in its illustrated center position by the two springs 68 and 69. Its piston rod is provided with an actuating portion 71, which whenever the piston moves out of the cylinder of the unit 70, will alternately engage in one and the other of the projections or recesses 72 and 73 of a rocker member 75 which is mounted for rocking movement about the axis or pivot 74. Thus, the rocker member 75 is alternately displaced towards the left or towards the right in FIG. 9.

When the rocker member 75 is displaced towards the left but from the right, that is in counter-clockwise direction, the control valve 76 is opened from its normally closed position, and displacement of the rocker member 75 in the opposite clockwise direction causes opening of the control valve 77, in each case by engagement of the actuating portions of the respective valves by parts of the rocker member 75. Spring-loaded abutments 78 and 79 are located at opposite sides of the rocker member 75 and its axis 74, and serve to hold the rocker member 75 in a readily displaceable condition but in the end position to which it has just been displaced. Thus, when the unit 70 is again activated, the portion 71 will move into the opposite projection or recess 72 or 73 and the rocker member 75 will be displaced to the opposite end position.

When the pumps 35 and 38 are actuated, the pressure medium is first supplied to the unit 70 which causes via the portion 71 displacement of the rocker member 75. Once the piston of the units 70 has reached its end position, an increased pressure builds up in the hydraulic system so that the pressure medium now can reach the control valves 76 and 77 via the now-opened relief valve 81 which may for instance be set to open at 5 atm. overpressure. If one of these valves 76 and 77 is opened, then the hydraulic circuit via the conduit 82, the units 30 and 13, the conduit 83 and one of the conduits leading to the pressure reservoir 55 is closed, with the direction of flow in this circuit—and thereby the operating direction of the pistons of the units 30 and 31—being determined by the valves 76 and 77. The return flow of the pressure medium in this case takes place via the conduits 84 and 61 which communicate with the reservoir 55 and the one-way valves 62 and 64. When the pumps 35 and 38 are deactivated, then the pressure which has developed in the unit 70 is reduced via the capillary tube 80, so that the unit 70 assumes one of its two rest positions.

During a renewed activation of the pumps 35 and 38 as a result of engagement of the roller 18 with the brackets 43 and 44, the rocker member 75 is displaced to in opposite direction via the unit 70, so that the control valve 77 is now opened. The pump pressure is then again supplied via the one-way valve 80, 81, the valve 71 and the conduit 83 to the right-hand side of the units 30 and 31, that is to the side opposite to the one to which it was previously supplied, with the fluid flow from the left-hand side of the units 30 and 31 passing via the conduit 82 and a pass-through of the open valve 77 to the pressure reservoir 55. This causes the pistons of the units 30 and 31 to be displaced in the direction opposite to their previous displacement, and results in concomitant displacement of the mounting rings 7 and thereby of the anti-skid bands 3. As a matter of safety it is advantageous that the unit 70 in this embodiment be connected with the pressure reservoir 55 via a relief valve 80 which may for instance be set to operate at 150 atm. overpressure.

The embodiment of FIG. 9 is simpler than that of the previous embodiments and further due to the utilization of two pumps at the same time provides increased safety, for instance if one of the pumps should become inoperative.

Figure 10:
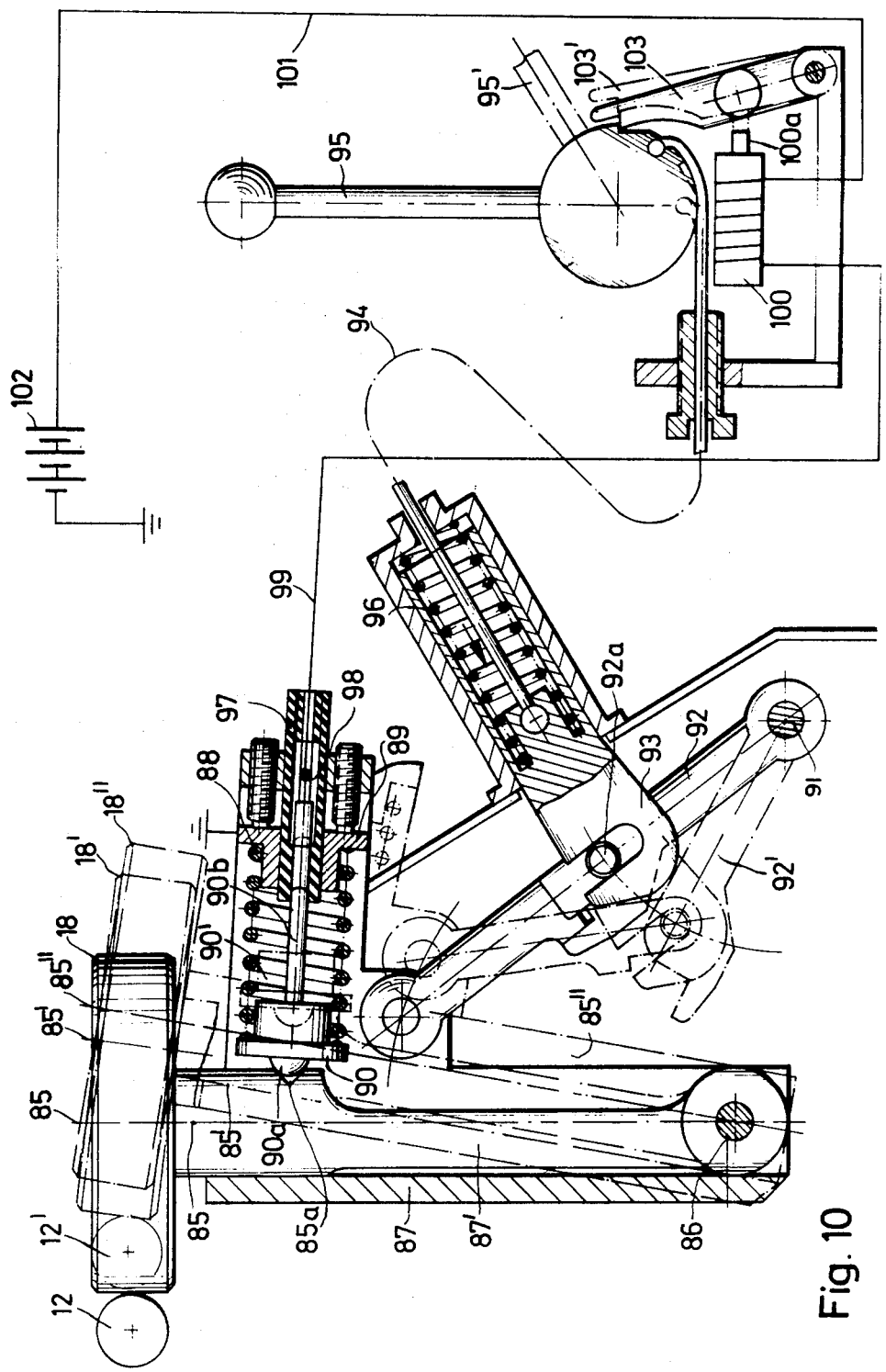
FIG. 10 illustrates a control arrangement for affording for adjusting the triggering means in the system shown in FIG. 9.

Coming, finally, to the embodiment illustrated in FIG. 10 it will be seen that this is a very simple mechanically operated control device for use in conjunction with the embodiment of FIG. 9. The embodiment of FIG. 10 primarily has the advantage that it is automatically de-activated when the anti-skid bands 3 have reached their respective end position, or if the bracket 12 becomes blocked as may occur, for instance, if stones, pieces of ice or the like become lodged between the wheel 6 and the bracket 12.

In FIG. 10 the roller 18 is turnably mounted not on the piston rod of cylinder as in the embodiment for instance of FIG. 7, but instead on a pivotable arm 85 which is pivotable about the axis 86 in direction normal to the plane of the wheel 6. A control arm 87 is similarly pivotably mounted on the axis 86. The arm 85 is pressed towards the arm 87 by means of a spring 88 which on the one hand abuts against a portion 89 which is rigid with the arm 87, and at the other end abuts against a pressure plate 90 which engages with a semi-circular projection 90a in a recess 85a of the arm 85.

A bell crank system 92 is provided between the arm 87 and a point 91 and a slider 93 is provided for activating this system 92. The slider is operatively associated with the pivot 92a of the system 92 and can be moved to its rearward or withdrawn position via a Bowden wire 94 which in turn is activatable with the control or operating handle or lever 95. Bowden wires are of course well known and require no further discussion. A spring 96 is tensioned in this manner and then displaces the slider 93 in the direction identified with the arrow when the handle or lever 95 is pivoted to its position illustrated in broken lines with reference numeral 95'. If the bracket 12 is to be actuated, then the handle 95 must be moved to the full-line position in which case the roller 18, the arm 85, the arm 87, the system 92 and the slider 93 are also in the positions shown in full lines in FIG. 10.

When the anti-skid bands 3 have been moved to one of their end positions, the units 30 and 31 produce an increased resistance so that the bracket 12 can no longer be displaced. It is then in the broken-line position 12'. The result of this is a movement of the roller 18 and of the arm 85 to the positions 18' and 85' shown in broken lines, with the arm 85 moving the plate 90 against the opposition of the spring 88 into the position 90' shown in broken lines. The plate 90 is provided on its reverse side with a contact projection 90b which is shiftably guided in the central bore of an insulating tube 97 which in turn is connected with the mounting abutment 89. A second or counter-contact 98 is provided within the tube 97 and connected via a conductor 99 with the winding of an electromagnet 100 the upper side of which is connected via the conductor 101 with one pole of a battery 102. The other pole of the battery 102 is connected with mass as shown. The portion 90b is similarly connected with mass so that the portion 90b and the contact 90a together constitute a switch which is interposed in the activating circuit of the electromagnet 100. This circuit is then closed when the bracket 12 moves to the broken-line position 12' as a result of which the electromagnet 100 is energized and its armature 100a moves the lever 103 to the broken-line position 103. This, in turn, frees the cam disc 95a which is provided on and rigid with the handle 95, so that the latter is moved to the broken-line zero position 95' under the influence of the pre-tension spring 96 and via the Bowden wire 94. At the same time the slider 93 shifts the bell crank system 92 to the position 92' shown in broken lines whereby the arm 87 moves to the position 87' and the roller 18 and the arms 85 move to the positions 18'' and 85'', respectively. In this manner the device is automatically de-activated when the anti-skid bands 3 reach their respective end positions.

In the embodiment according to FIG. 10 the relief valve 80' which otherwise is desirable in the FIG. 9 embodiment, can be omitted.

It is of course possible to de-activate the device of FIG. 10 manually rather than automatically. For this purpose it is simply necessary to move the detent 103 out of engagement with the can disc 95a, so that the handle 95 can then move to the position 95' and the roller 18 to the position 18''. The handle 95 can also be manually held in the position shown in full lines in FIG. 10 if desired. This may be desirable and advisable if contaminants, ice or the like which may have developed between the bracket 12 and the wheel 6 can still be removed by repeated action of the displaced roller 18 upon the bracket 12.

It will be understood that each of the elements described above, or two or more together, may also find a useful application in other types of constructions differing from the types described above.

While the invention has been illustrated and described as embodied in an anti-skid arrangement for wheeled vehicles, it is not intended to be limited to the details shown, since various modifications and structural changes may be made without departing in any way from the spirit of the present invention.

Without further analysis, the foregoing will so fully reveal the gist of the present invention that others can, by app-ying current knowledge, readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An anti-skid arrangement for wheeled vehicles, comprising a rotatable vehicle wheel having two oppositely facing axial sides; a pair of mounting rings each secured to one of said sides and displaceable circumferentially with reference to said wheel; a tire mounted on said wheel and having a circumferentially extending tread face provided with at least one groove extending across said tread face inclined to the circumferential direction thereof; an elongated anti-skid band partially and slidably received in said groove and having two spaced end portions each located at one of said axial sides and fixed to one of said mounting rings, and longitudinally adjacent spiked and non-spiked tread surface portions intermediate said end portions; displacing means actuatable for effecting stepwise circumferential displacement of said mounting rings in a sense causing concomitant longitudinal sliding of said band between two terminal positions in each of which one of said tread surface portions is accommodated and exposed in said groove; actuating means connected with said mounting rings for rotation with said wheel in a predetermined path and being operable for effecting actuation of said displacing means; and operator controllable triggering means movable between a rest position and an actuating position in which latter it extends into said predetermined path for triggering operation of said actuating means during each revolution of said wheel.

2. An arrangement as defined in claim 1, said wheel being provided with cutouts extending from one to the other of said axial sides; and further comprising traverse members extending through said cutouts and connecting said rings with one another.

3. An arrangement as defined in claim 2, said traverse members being rigid members.

4. An arrangement as defined in claim 2, said traverse members being elastically yieldable members.

5. An arrangement as defined in claim 2; and mounting means mounting said actuating means on said traverse members.

6. An arrangement as defined in claim 1; and further comprising operating means for effecting movement of said triggering means between said positions, said operating means including at least one operating device selected from the group including mechanically, hydraulically, pneumatically and electrically powered operating devices.

7. An arrangement as defined in claim 1; and further comprising operating means for effecting movement of said triggering means between said positions, said operating means comprising a pair of fluid-operated cylinders cooperating with said triggering means and acting upon the same in two directions which are inclined to one another at an acute angle.

8. An arrangement as defined in claim 1, said actuating means comprising a bracket member and resilient means resiliently engaging and resisting displacement of said bracket member by said triggering means from a normal inoperative position to an operative triggered position in which it effects actuation of said displacing means.

9. An arrangement as defined in claim 8, said triggering mean comprising a turnably mounted roller member movable between said rest position and said actuating position in which it is respectively out of engagement with and rollingly engages the respective bracket member for displacing the same to operative triggered position in response to rotation of said wheel.

10. An arrangement as defined in claim 9, said bracket members being arcuately curved and each extending along substantially half the circumference of said wheel.

11. An arrangement as defined in claim 1; said actuating means comprising two actuating elements, each of said actuating elements comprising a bracket member and resilient means resiliently engaging and resisting displacement of the respective bracket member from normal inoperative positions to operative triggered positions; and wherein said triggering means is operative for triggering displacement of said bracket members individually and independently of one another.

12. An arrangement as defined in claim 11, said displacing means being constructed and arranged for effecting stepwise circumferential displacement of said mounting rings in opposite circumferential directions.

13. An arrangement as defined in claim 11 each of said bracket members having a contact portion for engagement with said triggering means, and said engagement portions being spaced from the axis of rotation of said wheel by different radial distances; and adjusting means for effecting displacement of said triggering means by a distance corresponding to the difference between said radial distances.

14. An arrangement as defined in claim 11, said displacing means comprising a pair of toothed segments respectively mounted on said wheel, a pair of pawls each pivotably mounted on one of said bracket members, and spring means each urging the respective pawl towards engagement with the teeth of the associated segment.

15. An arrangement as defined in claim 11, said displacing means comprising at least a pair of fluid-operated cylinder and piston units operative for effecting displacement of said rings and connected with at least one of said rings at substantially diametrally opposite portions of the latter; and at least one force-moment compensating rod extending between and connecting said portions of said one ring.

16. An arrangement as defined in claim 1, said displacing means comprising fluid-operated cylinder and piston means operative for effecting displacement of said rings, fluid pump means cooperating with said cylinder and piston means for supplying fluid under pressure thereto, and control means controlling operation of said fluid pump means as a function of displacement of said bracket members between the inoperative and operative positions thereof.

17. An arrangement as defined in claim 16, and further comprising energy-storing means interposed between and connected with said wheel and said cylinder and piston means.

18. An arrangement as defined in claim 17, said energy-storing means comprising energy-storing spring element means.

19. An arrangement as defined in claim 16, said displacing means being double-acting cylinder and piston units, wherein said fluid pump means comprises two separate fluid pumps cooperating with said units for supplying fluid under pressure to the same at opposite axial sides of the pistons of said units, and wherein said control means separately controls the operation of the respective pumps.

20. An arrangement as defined in claim 16, said displacing means being double-acting cylinder and piston units, and said fluid pump means comprising two separate fluid pumps both connected with said units at the opposite axial sides of the respective pistons; said control means being operative for separately but sequentially controlling operation of said pumps in a sense energizing the latter sequentially during each revolution of said wheels; and switching means for switching the output of both of said pumps to either of said opposite axial sides at the will of an operator.

21. An arrangement as defined in claim 20, said switching means comprising a rocker member displaceable between two end positions, an auxiliary cylinder and piston unit operative for alternately displacing said rocker member between the respective end positions, first and second fluid-conduit means connecting said pumps with said opposite axial sides of the respective pistons, respectively; first and second control valve means interposed in said first and second fluid-conduit means, respectively, and alternately movable from closed to open position in response to displacement of said rocker member from one to the other of said end positions; and biasing means associated with said control valve means and normally urging the same to closed position.

22. An arrangement as defined in claim 21; and further comprising relief valve means in said fluid-conduit means intermediate said auxiliary cylinder and piston unit and said pumps.

23. An arrangement as defined in claim 22, said relief valve means comprising a capillary tube.

24. An arrangement as defined in claim 21, said rocker member comprising a pair of laterally adjacent abutment portions; further comprising a pair of resilient abutments each associated with one of said abutment portions and cooperating with said rocker member for maintaining the same in the respective end positions thereof in such a manner that each of said abutment portions assumes a predetermined orientation in space when said rocker member is in one of said end portions; and wherein said auxiliary cylinder and piston unit comprises a piston rod having a free end portion movable towards said rocker member in response to actuation of said auxiliary unit for engaging a respectiveone of said abutment portions to thereby effect displacement of the rocker member to the respectively other end position.

25. An arrangement as defined in claim 20, said triggering means comprising a roller member movable between said positions; and further comprising operating means for moving said roller member to said actuating position, including a Bowden wire connected with said roller member, spring means acting upon said Bowden wire and urging movement of said roller member to one of said positions thereof, and arrestable handle means connected with said Bowden wire for displacing the same and thereby said roller member to the other of said positions of the latter.

26. An arrangement as defined in claim 25, said operating means further comprising a bell crank linkage interposed between and connected with said Bowden wire and said roller member.

27. An arrangement as defined in claim 25, said operating means further comprising a control arm interposed between and connected with said Bowden wire and said roller member.

28. An arrangement as defined in claim 27, said triggering means further comprising a mounting arm turnably carrying said roller member, pivot means mounting said mounting arm for pivotal movement relative to said control arms between said rest and said actuating position, and biasing means acting upon said mounting arm and permanently opposing pivotal movement of the same from said rest position to said actuating position.

29. An arrangement as defined in claim 28, said biasing means being biasing sprig means.

30. An arrangement as defined in claim 28; further comprising arresting means for arresting said handle means in predetermined positions; release means for releasing said arresting means and including electromagnetic means; switch means provided on said control arm and in circuit with said electromagnetic means, said switch means being actuable in response to movement of said mounting arm to said actuating position and being operative for controlling energization of said electromagnetic means.

* * * * *